(12) United States Patent
Tahara

(10) Patent No.: US 7,066,292 B2
(45) Date of Patent: Jun. 27, 2006

(54) PEDALLING POWER GENERATION HEALTH MACHINE

(75) Inventor: Yoshimasa Tahara, Shimoniikawa-gun (JP)

(73) Assignee: Shirouma Saiensu Kabushiki Kaisha, Toyama (JP)

( * ) Notice: Subject to any disclaimer, the term of this patent is extended or adjusted under 35 U.S.C. 154(b) by 89 days.

(21) Appl. No.: 10/492,060

(22) PCT Filed: Jul. 22, 2002

(86) PCT No.: PCT/JP02/07381

§ 371 (c)(1),
(2), (4) Date: Apr. 8, 2004

(87) PCT Pub. No.: WO03/059461

PCT Pub. Date: Jul. 24, 2003

(65) Prior Publication Data

US 2005/0001403 A1    Jan. 6, 2005

(30) Foreign Application Priority Data

Jan. 16, 2002    (JP)    ............................. 2002-007042

(51) Int. Cl.
*B62M 23/02*    (2006.01)

(52) U.S. Cl. .................................................. 180/205
(58) Field of Classification Search ............... 180/205, 180/206, 207; 482/2, 5
See application file for complete search history.

(56) References Cited

U.S. PATENT DOCUMENTS

| | | | | |
|---|---|---|---|---|
| 598,819 A * | 2/1898 | Scott | ............................ | 180/220 |
| 3,511,097 A * | 5/1970 | Corwin | ..................... | 73/379.07 |
| 3,589,193 A * | 6/1971 | Thornton | ........................ | 482/2 |
| 3,884,317 A * | 5/1975 | Kinzel | ......................... | 180/220 |
| 5,857,762 A * | 1/1999 | Schwaller | .................... | 352/473 |
| 5,874,792 A * | 2/1999 | Chen et al. | ................ | 310/75 C |
| 6,717,280 B1* | 4/2004 | Bienville | ..................... | 290/1 R |
| 6,920,947 B1* | 7/2005 | Kamen et al. | ................ | 180/7.1 |

FOREIGN PATENT DOCUMENTS

| | | |
|---|---|---|
| JP | 54-169709 | 11/1979 |
| JP | 56-163669 | 12/1981 |
| JP | 2001-114179 | 4/1991 |
| JP | 5-317457 | 12/1993 |
| JP | 6-321170 | 11/1994 |
| JP | 9-299506 | 11/1997 |
| JP | 10-203467 | 8/1998 |
| JP | 2000-108978 | 4/2000 |
| JP | 2001-30974 | 2/2001 |
| JP | 2001-191976 | 7/2001 |

* cited by examiner

*Primary Examiner*—Tony Winner
(74) *Attorney, Agent, or Firm*—Jordan and Hamburg, LLP

(57) ABSTRACT

An apparatus of foot pedal working type for health maintenance equipped with a DC generator wherein electric current generated by the DC generator adapted to be driven by foot pedal working force is supplied to an electric device via a DC/DC converter, characterized in that the generated electric current supplied from the DC/DC converter to the electric device is controlled to increase or decrease and thereby a reaction force necessary for foot pedal working causing the DC generator to generate the electric current is controlled to increase or decrease.

2 Claims, 2 Drawing Sheets

PEDALLING POWER GENERATION HEALTH MACHINE

BACKGROUND OF THE INVENTION

The present invention relates to an apparatus of foot pedal working type for health maintenance equipped with a generator.

The conventional apparatus of foot pedal working type for health maintenance typically has no means for self-propelling and adapted to be always kept in stationary state for user's physical exercise. Such conventional apparatus merely displays a momentum but a kinetic energy generated by user's physical exercise is converted to a thermal energy which is uselessly released in the air.

An improved apparatus of foot pedal working type for health maintenance having a function to convert such kinetic energy to electric energy or the like and to store this converted energy is disclosed, for example, in Japanese Laid-Open Patent Application Gazette Nos. 1979-169709 and 1981-163669.

A self-propelled apparatus of foot pedal working type has been also proposed in the form of an electrically assisted bicycle in which the foot pedal working is assisted with a driving motor energized by battery. Such electrically assisted bicycle has been further improved so that the bicycle is provided, in addition to said driving motor, with a generator adapted to charge the battery for said driving motor, as disclosed, for example, in Japanese Laid-Open Patent Application No. 2001-191976.

PROBLEM TO BE SOLVED BY THE INVENTION

The present invention aims to provide an apparatus of foot pedal working type for health maintenance equipped with a generator wherein a kinetic momentum necessary for foot pedal working can be controllably adjusted and an electric current generated by a generator can be supplied to electric device such as an accumulator, further improved so that the kinetic momentum necessary for foot pedal working can be controlled in correlation with adjustment of a feed rate of electric current from the generator to the electric device.

The object set forth above is achieved, according to the present invention, by an apparatus of foot pedal working type for health maintenance equipped with a DC generator wherein electric current generated by the DC generator adapted to be driven by foot pedal working is supplied to an electric device via a DC/DC converter, said apparatus being characterized by that the generated electric current supplied from the DC/DC converter to the electric device is controlled to increase or decrease and thereby a reaction force necessary for foot pedal working causing the DC generator to generate said electric current is controlled to increase or decrease.

For this apparatus of foot pedal working type for health maintenance equipped with the DC generator, if it is desired to increase the momentum of foot pedal working, the current supplied to the accumulator from the DC/DC converter interposed between the DC generator and the electric device to be supplied with the electric current may be increased. In this way, the momentum of foot pedal working can be increased by increasing the reaction force of the foot pedal working mechanism causing the DC generator to generate electric current. If it is desired to decrease the momentum of foot pedal working, on the contrary, the current supplied to the electric device from the DC/DC converter may be decreased so as to decrease the reaction force of the foot pedal working mechanism causing the DC generator to generate electric current and thereby the momentum of foot pedal working may be decreased. Increase and decrease of the foot pedal working momentum can be correlated in this manner with increase and decrease of the current supplied to the electric device, respectively, to control the foot pedal working momentum and the current supplied to the electric device.

The present invention provides also the apparatus of foot pedal working type for health maintenance equipped with the DC generator according to first aspect of the invention, wherein the generated electric current to be supplied from the DC/DC converter to the electric device is controlled in the course of generation to be gradually increased or decreased and thereby the reaction force necessary for foot pedal working to cause the DC generator to generate the electric current is controlled to be gradually increased or decreased, according to a second aspect of the invention.

With this arrangement, the current supplied from the DC/DC converter to the electric device can be controlled to be gradually increased or decreased and thereby the reaction force of the foot pedal working mechanism causing the DC generator to generate electric current can be controlled to be gradually increased or decreased. Such arrangement is advantageous particularly when the foot pedal working is started before warming up because an excessive burden exerted on the driver due to an abruptly increased reaction force of the foot pedals can be alleviated and the reaction force can be controlled to be gradually increased as the foot pedal working is gradually accelerated.

The present invention provides also the apparatus of foot pedal working type for health maintenance equipped with the DC generator according to the first and second aspects of the invention, wherein the DC generator is mounted on a driving shaft of a foot pedal working mechanism, according to a third aspect of the invention.

With this arrangement, depending on a running speed, a slope of the course or a condition of the road surface, the DC generator mounted on the driving shaft of the foot pedal working mechanism may be driven and thereby the current supplied from the DC/DC converter to the electric device may be controlled to be increased or decreased while the apparatus is propelled to ensure that the electric device and a reaction force of the foot pedal working mechanism are simultaneously controlled to be increased or decreased for smooth running.

The present invention provides also the apparatus of foot pedal working type for health maintenance equipped with the DC generator according to the third aspect of the invention, wherein the DC generator is mounted on rotary shaft of a wheel or the like so as to serve as a braking mechanism so that the generated electric current to be supplied from the DC/DC converter to the electric device may be controlled to increase or decrease to control a braking effect of the DC generator, according to a fourth aspect of the invention.

With this arrangement, the generated electric current to be supplied from the DC/DC converter to the electric device may be increased to increase a reactive force of a propelling rotary shaft mounted on the DC generator while the bicycle runs at a high speed, for example, on level ground or on downhill slope. On ascending slope or punished road, inversely, the generated electric current to be supplied from the DC/DC converter to the electric device may be decreased to decrease the reactive force of the propelling rotary shaft mounted on the DC generator and thereby to release a braking effect for smooth running.

The present invention provides also the apparatus of foot pedal working type for health maintenance equipped with the DC generator according to any of the first through fourth aspects of the invention, wherein said electric device is an accumulator from which another electric device is energized, according to a fifth aspect of the invention.

With this arrangement, the electric current to be supplied from the DC/DC converter to the electric device may be controlled to be increased or decreased and simultaneously a reaction force of the foot pedal working mechanism may be controlled to be increased or decreased to ensure that the electric power with which the accumulator has been charged can be selectively supplied to the another electric device such as an assist driving motor, a display, a panel light or a warning horn.

The present invention provides also the apparatus of foot pedal working type for health maintenance equipped with the generator according to the fifth aspect of the invention, wherein said another electric device energized by the accumulator comprises a driving motor mounted on a rotary shaft of the foot the pedal working mechanism, according to a sixth aspect of the invention.

This arrangement is advantageous in that the electric power having been stored in the accumulator by increasing the reaction force of the foot pedal working mechanism, for example, while the user has an adequate bodily vigor or while the apparatus runs on downhill slope can be supplied to the driving motor mounted on rotary shaft of the foot pedal working mechanism, for example, when the user tired out or when the user encounters ascending slope. In this way, the driving force obtained by foot pedal working can be assisted to enjoy comfortable use of the apparatus.

The present invention provides also the apparatus of foot pedal working type for health maintenance equipped with the DC generator according to any of the first through sixth aspect of the invention, wherein a driving shaft of the DC generator and the foot pedal working mechanism are interlocked with each other in a manner such that both the driving shaft and the foot pedal working mechanism are operatively associated with each other only in a direction from the foot pedal working mechanism to the driving shaft of the DC generator and rotate only in a direction of foot pedal working, according to a seventh aspect of the invention.

With this arrangement, for example, when the apparatus is being propelled by foot pedal working, the DC generator can be actuated by such foot pedal working adapted to rotate the driving shaft of the DC generator. When the apparatus is being running at a high speed or running on downhill slope or running with assist by the driving motor, the rotary shaft for foot pedal working can be stopped and thereby the user's tired body can be relieved.

BRIEF DESCRIPTION OF THE DRAWINGS

Accompanying the specification are figures which assist in illustrating the embodiments of the invention, in which.

DETAILED DESCRIPTION OF THE INVENTION

Details of the present invention will be more fully understood from the description of the preferred embodiments given hereunder in reference with the accompanying drawings.

Figure 1:
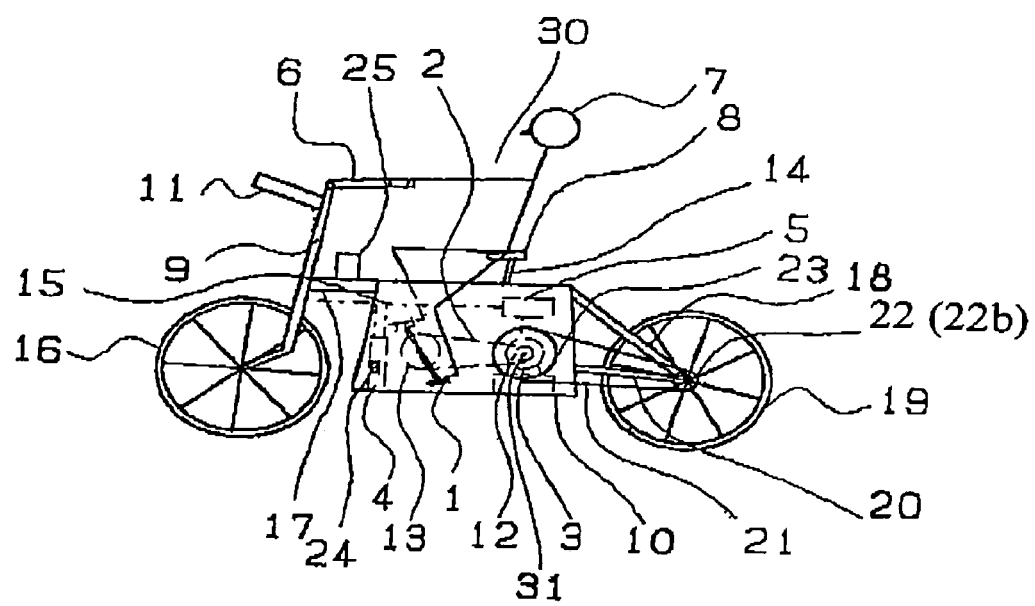
FIG. 1 is a simplified side view illustrating one preferred embodiment of the apparatus of foot pedal working type for health maintenance equipped with a generator according to the present invention.

Referring to FIG. 1, reference numeral 30 designates a main body of an apparatus of foot pedal working type for health maintenance equipped with a DC generator in form of a self-propelled bicycle adapted to be driven by working of the foot pedals. According to this embodiment, the main body 30 comprises the bicycle having front and rear wheels 16, 19. Between these front and rear wheels 16, 19, a supporting member 10 fixed by a front frame 17 and rear frames 18, 20 wherein the supporting member 10 is provided with foot pedals 1 serving as one of driving means, a DC generator, a driving motor and an accumulator 4. The driving motor is provided coaxially with a driving shaft 31 of the DC generator 3.

Above the supporting member 10, there is provided a saddle 8 for a driver 7 fixed by a saddle shaft 14 and the front wheel 16 is operatively associated with a handle shaft 9 rotatably mounted on the front frame 17. The handle shaft 9 is provided on its upper end with a handle 6. the handle shaft is provided on its upper portion with display means 11 extending forward in front of the handle 6 so as to display various amounts such as momentum, generated electric current and charged electric current.

A sprocket 13 mounted on a rotary shaft of the pedals 1 and a sprocket 12 mounted on a driving shaft 31 of the DC generator 3 are coupled to each other by transmission means 2 such as chain so that a rotary movement of the pedals 1 may be transmitted to the DC generator 3 and thereby rotate the rotary shaft 31 of the DC generator 3 to generate electric current. In the case of this embodiment, the driving shaft 31 of DC generator 3 and the sprocket 12 are coupled to each other in a manner such that a driving force can be transmitted only in a pedal working direction but not from the driving shaft 31 to a rotary shaft of the pedals 1.

A sprocket 23 mounted on the driving shaft 31 of the DC generator 3 and a sprocket 22 mounted on a rotary shaft 22b of the rear wheel 19 are coupled to each other by transmission means 21 such as chain in a manner such that a rotational movement of the pedals 1 can be transmitted also to the rear wheel 19.

In this way, the driver 7 may work the pedals 1 to self-propel the apparatus and simultaneously to cause the DC generator 3 to generate electric current. Reference numeral 5 designates an electric controller.

In the case of this embodiment, the driving shaft 31 of the DC generator and the rotary shaft of the rear wheel 19 are coupled to each other so as to be integrally rotated. During the motor-driven running, the rear wheel 19 may be driven by the driving motor but, for example, during running on a downhill slope, the driving motor is deenergized and the DC generator 3 offers an appropriate braking function also. Specifically, the driving shaft 31 of the DC generator 3 is rotated as the rear wheel 19 rotates so that the DC generator 3 may generate electric current and simultaneously operate as braking means.

The DC generator 3 functions as the generator so far as the apparatus runs at a normal speed but brakes rotation of the rear wheel 19 when the apparatus runs at a high speed, for example, on the downhill slope.

The DC generator 3 and the driving motor are located between the front and rear wheels 16, 19 to ensure that the apparatus as a whole can be easily stabilized during running.

Figure 2:
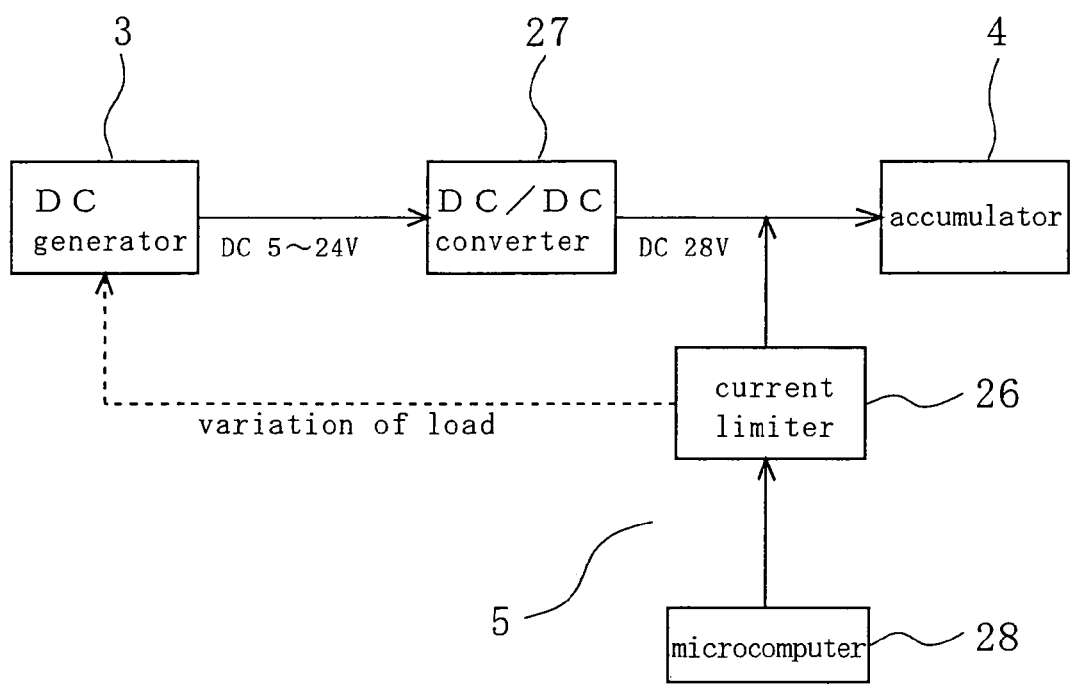
FIG. 2 is a block diagram illustrating a control circuit in this embodiment.

Referring now to FIG. 2 illustrating an embodiment of the electric controller 5, electric current of DC 5 V to 24 V generated from the DC generator 3 as the foot pedals are worked is boosted by DC/DC converter 27 up to DC current of 28 V which is, in turn, supplied to the DC 24 V accumulator 4. In the apparatus of foot pedal working type for health maintenance equipped with the DC generator as illustrated, the current supplied from the DC/DC converter 27 to the accumulator 4 is controlled by a current limiter 26 and thereby a load on the DC generator is controlled so that a reaction force of the foot pedal working mechanism for generation may be controlled.

In the above described embodiment of the electric control, for example, when it is desired to energize an electric device with DC 24 V, it is possible to combine the generating function of the DC generator 3 with the boosting function of the DC/DC converter 27 so that the current of DC 5 V to 20 V generated from the DC generator 3 by the driving force of the foot pedals may be supplied to such electric device after boosted by the DC/DC converter 27 to the current of DC 24 V.

According to the above described embodiment of the apparatus of foot pedal working type for health maintenance equipped with the DC generator according to the present invention, if it is desired to increase the momentum of foot pedal working, the current supplied to the accumulator 4 from the DC/DC converter 27 interposed between the DC generator 3 and the electric device to be supplied with the electric current from the DC generator 3, i.e., the accumulator 4 may be increased by restraining a limiting effect of the current limiter 26. In this way, the momentum of foot pedal working can be increased by increasing the reaction force of the foot pedal working mechanism causing the DC generator 3 to generate electric current. If it is desired to decrease the momentum of foot pedal working, on the contrary, the current supplied to the accumulator 4 from the DC/DC converter 3 may be decreased so as to decrease the reaction force of the foot pedal working mechanism causing the DC generator 3 to generate electric current and thereby the momentum of foot pedal working may be decreased. Increase and decrease of the foot pedal working momentum can be correlated in this manner with increase and decrease of the current supplied to the accumulator 4, respectively, to control the foot pedal working momentum and the current supplied to the accumulator.

In the above described embodiment of the electric controller 5 according to the present invention, the current supplied from the DC/DC converter 27 to the electric device such as the accumulator 4 can be controlled to be gradually increased or decreased by controlling the limiting effect of the current limiter 26 by a microcomputer 28 to be gradually increased or decreased and thereby the reaction force of the foot pedal working mechanism causing the DC generator to generate electric current can be controlled to be gradually increased or decreased.

In this embodiment of the present invention, the current supplied from the DC/DC converter 27 to the electric device such as the accumulator 4 can be controlled to be gradually increased or decreased and thereby the reaction force of the foot pedal working mechanism causing the DC generator to generate electric current can be controlled to be gradually increased or decreased. Such arrangement is advantageous particularly when the foot pedal working is started before warming up because an excessive burden exerted on the driver due to an abruptly increased reaction force of the foot pedals can be alleviated and the reaction force can be controlled to be gradually increased as the foot pedal working is gradually accelerated. In this way, it is not apprehended that the driver's foot or feet might be damaged at starting his or her physical exercise.

Referring to FIG. 1, reference numeral 15 designates a wire connection between the DC generator 3 and the accumulator 4.

Reference numeral 25 designates a control switch for the current limiter 26, which is not only adapted for variable increase or decrease of a load on the DC generator 3 but also for turning on or off of the driving motor.

The control switch 25 may be mounted selectively on the front frame 17, the handle 6, the display 11 or the other part and it is possible to provide not only a single control switch 25 but also two or more control switches at different locations. It is also possible divide the control switch 25 into a plurality of control switches depending its various functions such as increasing or decreasing of a load, turning on and off. The display 11 is adapted to display various data such as kinetic momentum, electric current generated and electric current accumulated.

The display 11 may be provided with control means so that the electric current generated, the reaction force of the foot pedals working and the driving force of the driving motor may be controllably adjusted.

Instead of coupling the foot pedals 1, the DC generator 3 and the driving motor one to another by the transmission means 2 as in the illustrated embodiment, it is possible to mount the DC generator 3 and the driving motor directly on the rotary shaft of the foot pedals 1 without provision of the transmission means 2. The main body 30 of the apparatus is not limited to the bicycle having the front and rear wheels 16, 19 but may be provided in form of a tricycle having a single front wheel and a pair of rear wheels, a tricycle having a pair of front wheels and a single rear wheel and may be even in form of quadricycle having a pair of front wheels and a pair of rear wheels. It is also possible to replace the wheels by the other running means such as caterpillars.

In the above described embodiment, when the driver works the foot pedals 1 with the control switch 25 changed over to the side of generation, a rotary force of the pedals 1 is transmitted to the sprocket 12 via the sprocket 13 and the transmission means 2 whereupon the DC generator 3 is rotated to generate electric current. The accumulator 4 is charged with the electric current generated in this manner via the DC/DC converter 27. The rotary force is transmitted also to the rear wheel 19 via the sprocket 23 and transmission means 2 so that the apparatus can be self-propelled with the DC generator continuing to generate electric current.

With transmission mechanism coupling the sprocket 22 directly to the sprocket 23, electric current generation is ensured even if the apparatus runs on a downhill slope without foot pedal working by the driver. The accumulator 4 is provided with an output terminal 24 so that the electric current with which the accumulator 4 has been charged can be used to energize the various means such as displays and panel lights.

As has already been described, the current to be supplied from the DC/DC converter 27 to the accumulator 4 via the control switch 25 may be controlled by the current limiter 26 to be increased or decreased and thereby the load on the DC generator 3 may be controlled to be increased or decreased. In this way, the reaction force of the foot pedal working mechanism can be controllably adjusted.

When the apparatus runs with the control switch 25 changed over to the side of driving, the electric current with which the accumulator 4 has been charged is supplied to the driving motor which is then rotated together with the DC generator 3. In this way, the apparatus can be self-propelled in the motor-driven mode. Furthermore, a free hub ensured that the rotary force of the driving motor is not transmitted to the sprocket, so the foot pedals 1 can be maintained in stationary state and the driver can recreate his or her feet.

As will be apparent from the foregoing description, the present invention relates to the apparatus of foot pedal working type for health maintenance equipped with a DC generator wherein electric current generated by the DC generator adapted to be driven by foot pedal working is supplied to an electric device via a DC/DC converter, characterized by that the generated electric current supplied from the DC/DC converter to the electric device is controlled to increase or decrease and thereby a reaction force necessary for foot pedal working causing the DC generator to generate said electric current is controlled to increase or decrease. For this apparatus of foot pedal working type for health maintenance equipped with the DC generator, if it is desired to increase the momentum of foot pedal working, the current supplied to the accumulator from the DC/DC converter interposed between the DC generator and the electric device to be supplied with the electric current may be increased. In this way, the momentum of foot pedal working can be increased by increasing the reaction force of the foot pedal working mechanism causing the DC generator to generate electric current. If it is desired to decrease the momentum of foot pedal working, on the contrary, the current supplied to the electric device from the DC/DC converter may be decreased so as to decrease the reaction force of the foot pedal working mechanism causing the DC generator to generate electric current and thereby the momentum of foot pedal working may be decreased. Increase and decrease of the foot pedal working momentum can be correlated in this manner with increase and decrease of the current supplied to the electric device, respectively, to control the foot pedal working momentum and the current supplied to the electric device.

The present invention relates also to the apparatus of foot pedal working type for health maintenance equipped with the DC generator according to the first aspect of the invention, wherein the generated electric current to be supplied from the DC/DC converter to the electric device is controlled in the course of generation to be gradually increased or decreased and thereby the reaction force necessary for foot pedal working to cause the DC generator to generate the electric current is controlled to be gradually increased or decreased according to the second aspect of the invention.

In this embodiment of the present invention, the current supplied from the DC/DC converter to the electric device can be controlled to be gradually increased or decreased and thereby the reaction force of the foot pedal working mechanism causing the DC generator to generate electric current can be controlled to be gradually increased or decreased. Such arrangement is advantageous particularly when the foot pedal working is started before warming up because an excessive burden exerted on the driver due to an abruptly increased reaction force of the foot pedals can be alleviated and the reaction force can be controlled to be gradually increased as the foot pedal working is gradually accelerated.

The present invention relates also to the apparatus of foot pedal working type in the form of a bicycle for health maintenance equipped with the DC generator according to the first or second aspects of the invention, wherein the DC generator is mounted on a driving shaft of a foot pedal working mechanism, according to the third aspect of the invention. For this apparatus of foot pedal type in the form of the bicycle, depending on a running speed, a slope of the course or a condition of the road surface, the DC generator mounted on the driving shaft of the foot pedal working mechanism may be driven and thereby the current supplied from the DC/DC converter to the electric device may be controlled to be increased or decreased while the apparatus is propelled to ensure that the electric device and a reaction force of the foot pedal working mechanism are simultaneously controlled to be increased or decreased for smooth running.

The present invention relates also to the apparatus of foot pedal working type in the form of the bicycle for health maintenance equipped with the DC generator according to the third aspect of the invention, wherein the DC generator is mounted on rotary shaft of a wheel or the like so as to serve as a braking mechanism so that the generated electric current to be supplied from the DC/DC converter to the electric device may be controlled to increase or decrease to control a braking effect of the DC generator, according to the fourth aspect of the invention. For this apparatus of foot pedal working type in the form of the bicycle for health maintenance, the generated electric current to be supplied from the DC/DC converter to the electric device may be increased to increase a reactive force of a propelling rotary shaft mounted on the DC generator while the bicycle runs at a high speed, for example, on level ground or on downhill slope. On ascending slope or punished road, inversely, the generated electric current to be supplied from the DC/DC converter to the electric device may be decreased to decrease the reactive force of the propelling rotary shaft mounted on the DC generator and thereby to release a braking effect for smooth running.

The present invention relates also to the apparatus of foot pedal working type for health maintenance equipped with the DC generator according to any according to any one of the first through fourth aspects of the invention, wherein said electric device is an accumulator from which another electric device is energized, according to the fifth aspect of the invention. With this arrangement, the electric current to be supplied from the DC/DC converter to the electric device may be controlled to be increased or decreased and simultaneously a reaction force of the foot pedal working mechanism may be controlled to be increased or decreased to ensure that the electric power with which the accumulator has been charged can be selectively supplied to the another electric device such as an assist driving motor, a display, a panel light or a warning horn.

The present invention relates also to the apparatus of foot pedal working type for health maintenance equipped with the generator according to the fifth aspect of the invention, wherein said another electric device energized by the accumulator comprises a driving motor mounted on a rotary shaft of the foot the pedal working mechanism, according to the sixth aspect of the invention. This arrangement is advantageous in that the electric power having been stored in the accumulator by increasing the reaction force of the foot pedal working mechanism, for example, while the user has an adequate bodily vigor or while the apparatus runs on downhill slope can be supplied to the driving motor mounted on rotary shaft of the foot pedal working mechanism, for example, when the user tired out or when the user encounters ascending slope. In this way, the driving force obtained by foot pedal working can be assisted to enjoy comfortable use of the apparatus.

The present invention relates also to the apparatus of foot pedal working type for health maintenance equipped with the DC generator according to any of the first through sixth aspects of the invention, wherein a driving shaft of the DC generator and the foot pedal working mechanism are interlocked with each other in a manner such that both the driving shaft and the foot pedal working mechanism are operatively associated with each other only in a direction from the foot pedal working mechanism to the driving shaft of the DC generator and rotate only in a direction of foot pedal working, according to the seventh aspect of the invention. For example, when the apparatus is being propelled by foot pedal working, the DC generator can be actuated by such foot pedal working adapted to rotate the driving shaft of the DC generator. When the apparatus is being running at a high speed or running on downhill slope or running with assist by the driving motor, the rotary shaft for foot pedal working can be stopped and thereby the user's tired body can be relieved.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. An apparatus for health maintenance equipped with a DC generator, the apparatus comprising:
   a foot pedal;
   wherein:
   electric power generated by the DC generator adapted to be driven by foot pedal working is supplied to an electric device via a DC/DC converter;
   the generated electric current supplied from the DC/DC converter to the electric device is controlled to increase or decrease;
   thereby a reaction force necessary for foot pedal working causing the DC generator to generate said electric current is controlled to increase or decrease;
   wherein the DC generator is mounted on a rotary shaft of a wheel as to serve as a braking mechanism so that the generated electric current to be supplied from the DC/DC converter to the electric device may be controlled to increase or decrease to control a braking effect of the DC generator.

2. An apparatus for health maintenance equipped with a DC generator, the apparatus comprising:
   a foot pedal;
   wherein;
   electric power generated by the DC generator adapted to be driven by foot pedal working is supplied to an electric device via a DC/DC converter;
   the generated electric current supplied from the DC/DC converter to the electric device is controlled in the course of generation to be gradually increased or decreased;
   thereby the reaction force necessary for foot pedal working causing the DC generator to generate said electric current is controlled to be gradually increased or decreased; and
   wherein the DC generator is mounted on a rotary shaft of a wheel so as to serve as a braking mechanism so that the generated electric current to be supplied from the DC/DC converter to the electric device may be controlled to increase or decrease to control a braking effect of the DC generator.

* * * * *